INVENTOR.
John G. Buchholz
ATTORNEY

United States Patent Office 3,508,388
Patented Apr. 28, 1970

3,508,388
OPPOSITELY ACTING SICKLE BAR FOR MOWERS
John G. Buchholz, Roggen, Colo.
(Rte. 3, Sterling, Colo. 80751)
Filed Nov. 15, 1967, Ser. No. 683,304
Int. Cl. A01d 55/02
U.S. Cl. 56—297
2 Claims

ABSTRACT OF THE DISCLOSURE

A mower cutter bar having conventional, spaced-apart guards projecting forwardly therefrom and two longitudinally aligned knife bars provided with conventional knife sections, in shearing engagement with said guards, positioned in slidable engagement with the forward edge of said cutter bar, each of said knife bars being substantially one-half the length of said cutter bar and having means for longitudinally and simultaneously reciprocating the two knife bars in opposite directions.

---

This invention relates to a mower and more particularly to the sickle bar structure of a mower. Conventional power-driven mowers employ an elongated cutter bar from which a plurality of guide fingers project forwardly in spaced relation. A knife bar provided with triangular knife sections reciprocates transversally of the guard fingers to shear the crop against the latter. Thus, when the knife bar is travelling outwardly the reaction of the outward shearing action urges the mower outwardly and, when the knife bar travels inwardly, the reaction is reversed and the mower is urged inwardly. Therefore, the mower is constantly subjected to a severe lateral vibration when in use which results in rapid wear and deterioration of the machine elements. This is occasioned by the fact that all of the knife sections throughout the entire length of the single knife bar move in the same direction at the same time.

The principal object of this invention is to separate the conventional knife bar into two similar, axially aligned knife bar sections of substantially equal length and to provide means for simultaneously and continuously reciprocating the two sections in opposite directions so that the shearing reactions of each section will be simultaneously opposed by an equal and opposite shearing action of the other section so as to eliminate the transmission of lateral vibration to the mower.

A further object is to accomplish the above with a minimum disturbance of the conventional mower structure so that present mowers can be easily and economically adapted to the improved non-vibration operation.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

Figures 1A, 1B, 2, 3:
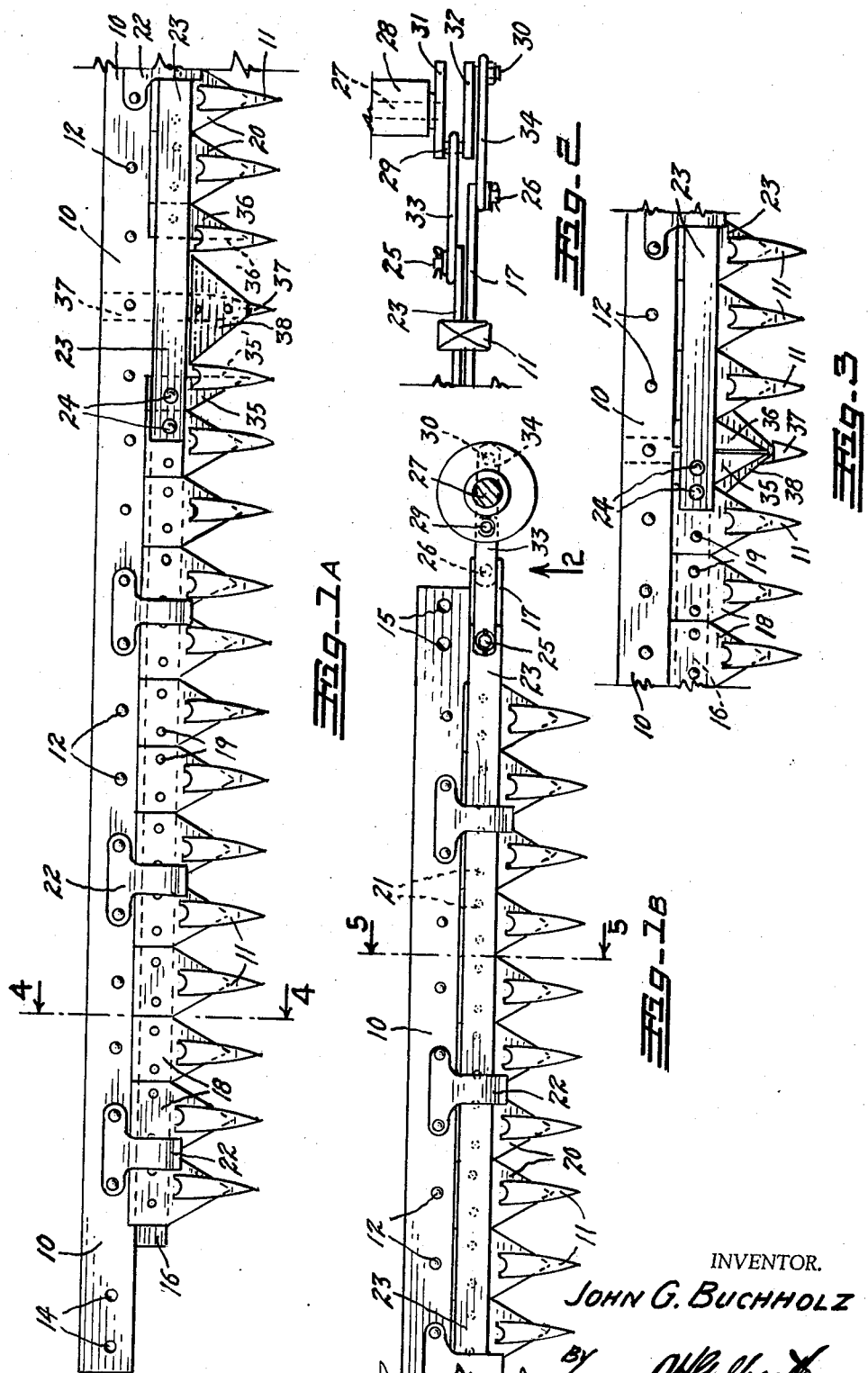
FIG. 1A is a plan view of the outer extremity of a mower cutter bar showing a first position, which will be hereinafter referred to as the "open position," of the operating elements of this invention.
FIG. 1B is a continuation of FIG. 1A showing the inner extremity of the cutter bar.
FIG. 2 is a fragmentary detail view looking in the direction of the arrow "2" in FIG. 1B.
FIG. 3 is a fragmentary, plan view of the mid-portion of the cutter bar showing the operating elements in a second or "closed position"
Figure 4:
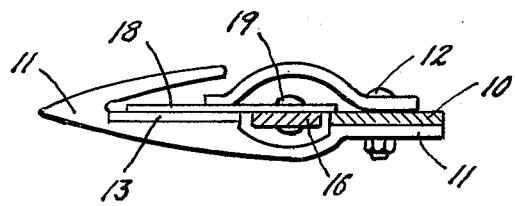
FIG. 4 is an enlarged detail cross-section taken on the line 4—4, FIG. 1A.

A mower cutter bar is shown at 10 on the drawing beneath which a plurality of the usual fingers or guards 11 are riveted, by means of guard rivets 12, so as to extend forwardly in spaced-apart relation as is customary with conventional power driven mowers. The guards 11 are provided with the usual ledger plates 13. The cutter bar 10 is drilled adjacent its outer extremity, as shown at 14, for attachment of the usual accessory equipment such as guide shoes, crop lifters, etc. and is drilled adjacent its inner extremity, as indicated at 15 for attachment to the conventional sickle support of the mower.

In the usual mower, a single slidable knife bar is positioned forwardly of the cutter bar and extends throughout the entire length thereof. In this invention, the customary single knife bar is replaced by an outer knife bar 16 and an inner knife bar 17, of substantially equal length, which are positioned forwardly of the cutter bar 10 in longitudinal alignment with each other to replace the usual single knife bar.

Conventional, triangular knife sections 18 are riveted, by means of knife rivets 19, in side by side relation along and above the knife bar 16 and similar knife sections 20 are similarly riveted, by means of knife rivets 21 along and beneath the knife bar 17. The sections project forwardly into shearing relation with the ledger plates of the guards 11 as is customary with conventional mowers. The usual arched "hold down knife clips," as shown at 22, are secured by means of the guard rivets 12, to the cutter bar 10 at spaced-apart points and frictionally bear against the knife sections 18 and 20 to maintain the latter in shearing relation to the ledger plates of the guards 11.

As thus far described, the mower elements are substantially similar to the sickle element of a conventional mower except for the fact that the usual single knife bar, which conventionally moves all of the knife sections unitarily in a common direction, is replaced by the aligned knife bars 16 and 17 which enables one-half of the knife sections 18 to move simultaneously with, but in a direction opposite to, the direction of movement of the other half of the knife sections 20 to eliminate lateral vibration.

The duo-directional movement is accomplished by means of a connecting bar 23 which is riveted to the inner extremity of the outer knife bar, by means of suitable rivets 24, and extends inwardly over and in frictional engagement with the knife sections 20 beneath the hold down clips 22. The inner extremity of the connecting bar 23 is provided with an upwardly extending wrist pin 25 and the inner extremity of the inner knife bar 17 is similarly provided with a downwardly extending wrist pin 26.

The inner extremities of the connecting bar 23 and the inner knife bar 17 extend to the inner extremity of the cutter bar 10 and are provided with any suitable means for simultaneously reciprocating them in opposite directions depending upon the type of implement upon which the sickle is to be used.

For instance, many types of conventional mowers are provided with a crank shaft 27, extending from a bearing sleeve 28 fixedly attached to the mower, the shaft being driven from the power take-off of the mower-propelling tractor. In the conventional mower, the single knife bar is connected to a single crank on the crank shaft. To apply this invention, the single crank is replaced by a double crank structure having two oppositely positioned crank pins 29 and 30 extending from crank discs 31 and 32, respectively. The crank pin 29 is connected by means of a pitman or connecting rod 33 to the wrist pin 25 and the crank pin 30 is connected by means of a second similar connecting rod 34 to the wrist pin 26.

Thus, if the shaft 27 be rotated in either direction, the inner and outer sets of triangular knife sections 18 and 20, respectively, will be simultaneously reciprocated in opposite directions so their crop-cutting reactions will be opposed and balanced to reduce the damaging longitudinal vibration of the cutter bar 10.

The innermost extremity of the outer knife bar 16 and the outermost extremity of the inner knife bar 17 terminate in half knife sections 35 and 36, respectively, having vertical cutting edges 35' and 36', respectively. It can be seen that when the knife bars 16 and 17 are moved fully apart in the cutting cycle, as shown in FIG. 1A, the cutting edges 35' and 36' will separate to expose a space equal to twice the normal spacing between the guards and when the knife bars are moved fully together, the cutting edges will substantially contact as shown in FIG. 3. At the point where the cutting edges come together, a special guard 37 is mounted beneath and extends forwardly from the cutter bar 10 to fixedly support a relatively wide shearing plate 38 in the plane of the ledger plates on the remaining guards. The shearing plate is in the shape of an isosceles triangle with its apex directed forwardly. It can be seen that as the two cutting edges 35' and 36' approach each other they will exert a shearing action on the two inclined sides of the shearing plate 38 and as they move away from each other, the two half-knife sections 35 and 36 move away from each other and they will exert a shearing action against the ledger plates on the two adjacent guards 11 so as to prevent leaving standing crop between the two oppositely moving sets of knife sections 18 and 20.

Thus, the crop will be completely sheared throughout the entire length of the cutter bar but the shearing will be simultaneously accomplished in opposite directions to avoid moving the cutter bar longitudinally.

Figure 5:
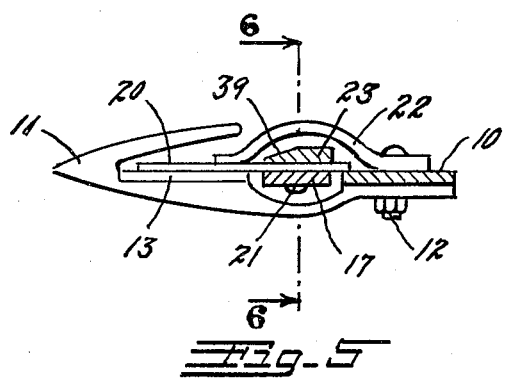
FIG. 5 is a similar cross-section taken on the line 5—5, FIG. 2B.
Figure 6:
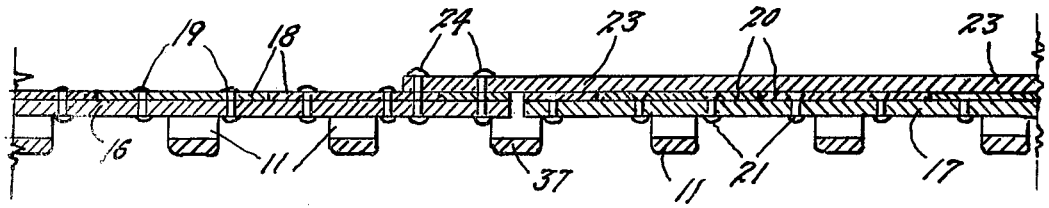
FIG. 6 is a fragmentary, enlarged, longitudinal section of the mid-portion of the cutter bar, taken on the line 6—6, FIG. 5, showing the operating elements in the closed position.

The forward edge of the connecting bar 23 is preferably tapered as shown at 39 in FIG. 5 to prevent obstruction of the passing cut crop. The rivets 21 are countersunk at their upper extremities to prevent interference with the connecting bar 23.

While a specific form of the invention has been described and illustrated herein, it is to be understood that the same may be varied within the scope of the appended claims, without departing from the spirit of the invention.

Having thus described the invention, what is claimed and desired to be secured by Letters Patent is:

1. A sickle structure for mowers comprising:
   (a) an elongated cutter bar provided with spaced-apart forwardly-extending, shearing guards;
   (b) an elongated outer knife bar, having a length approximating one-half the length of said cutter bar, positioned forwardly of and in parallel relation with the outer half of said cutter bar for longitudinal reciprocation therealong;
   (c) an elongated inner knife bar similarly positioned forwardly of the inner half of said cutter bar;
   (d) knife sections fixedly mounted on both said knife bars and cooperating with said guards to shear a crop when said knife bars are reciprocated longitudinally;
   (e) means for simultaneously reciprocating said knife bars in opposite directions so that the outer extremity of the inner knife bar cyclically moves away from the inner extremity of the outer knife bar to leave a medial open space forwardly of said cutter bar; and
   (f) an isosceles-shaped shearing plate supported from said cutter bar in said open space with its apex directed forwardly so that the adjacent terminal knife sections of said knife bars will move into shearing relation with the opposite inclined sides of said shearing plate as they approach each other to close said open space.

2. A sickle structure for mowers as described in claim 1 in which the adjacent sides of the two terminal knife sections are positioned at 90° to the axes of said knife bars so that they will be in closely-spaced, parallel relation when said open space is cyclically closed.

References Cited

UNITED STATES PATENTS

| 55,084 | 5/1866 | Gillam | 56—297 |
| 94,918 | 9/1869 | Shaw | 56—297 |
| 105,111 | 7/1870 | Mewes | 56—297 |
| 129,357 | 7/1872 | Mewes | 56—297 |

FOREIGN PATENTS

| 3,383 | 11/1869 | Great Britain. |

RUSSELL R. KINSEY, Primary Examiner